United States Patent [19]

Levine

[11] Patent Number: 4,496,982
[45] Date of Patent: Jan. 29, 1985

[54] COMPENSATION AGAINST FIELD SHADING IN VIDEO FROM FIELD-TRANSFER CCD IMAGERS

[75] Inventor: Peter A. Levine, West Windsor, N.J.

[73] Assignee: RCA Corporation, New York, N.Y.

[21] Appl. No.: 382,422

[22] Filed: May 27, 1982

[51] Int. Cl.³ ............................................. H04N 5/34
[52] U.S. Cl. .................................. 358/221; 358/213; 357/24; 307/279
[58] Field of Search ...................... 358/213, 221, 163; 357/24 LR; 307/279

[56] References Cited

U.S. PATENT DOCUMENTS

| | | | |
|---|---|---|---|
| 3,737,571 | 6/1973 | Gaebele et al. | 358/221 |
| 3,801,884 | 4/1974 | Sequin | 357/24 |
| 3,806,729 | 4/1974 | Caywood | 250/339 |
| 3,814,849 | 6/1974 | Bucher et al. | 178/7.2 |
| 3,814,955 | 6/1974 | Itoh et al. | 307/304 |
| 3,819,953 | 6/1974 | Puckette et al. | 307/221 D |
| 3,819,954 | 6/1974 | Butler et al. | 307/221 D |
| 3,919,471 | 11/1975 | Spiessbach et al. | 358/163 |
| 3,963,942 | 6/1976 | Sequin et al. | 307/221 D |
| 4,293,877 | 10/1981 | Tsunekawa et al. | 358/213 |
| 4,498,105 | 2/1985 | Crawshaw | 358/213 |

OTHER PUBLICATIONS

"Virtual-Phase Structure Simplifies Clocking for CCD Image Sensor", E. F. Rybaczewski, *Electronics*, Apr. 21, 1982, pp. 141–144.

Primary Examiner—Tommy P. Chin
Assistant Examiner—Michael D. Parker
Attorney, Agent, or Firm—Joseph S. Tripoli; George E. Haas; Allen L. Limberg

[57] ABSTRACT

A video signal originating from a field-transfer CCD imager exhibits field shading attributable to integrated dark currents. A compensating waveform is generated and linearly combined with the video signal to suppress that field shading.

28 Claims, 8 Drawing Figures

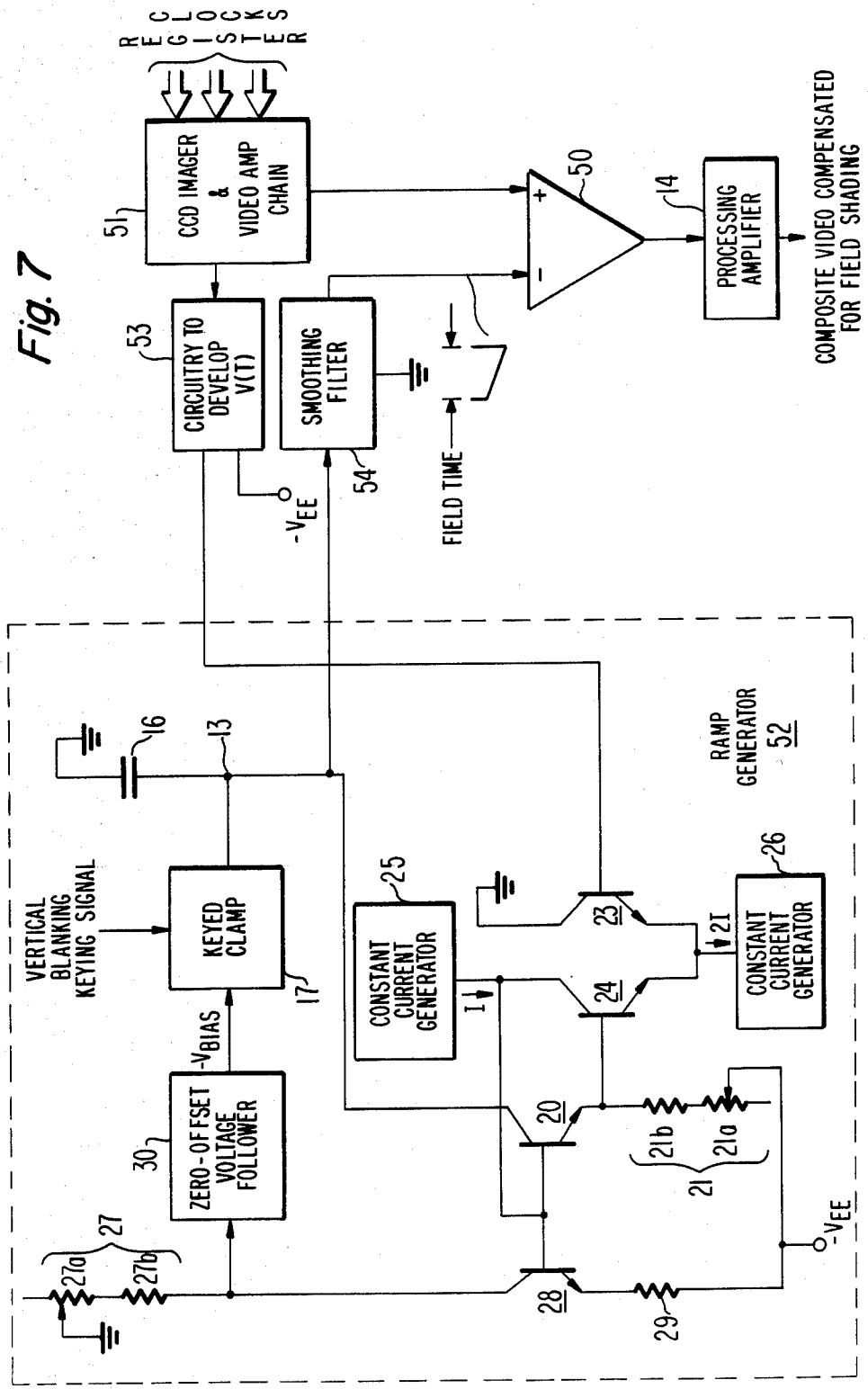

COMPENSATION AGAINST FIELD SHADING IN VIDEO FROM FIELD-TRANSFER CCD IMAGERS

The present invention relates to systems such as television, the use of cameras using charge-coupled-device (CCD) imagers of the field-transfer type and, more particularly, to the problem of integrated dark currents in such imagers introducing field shading into raster scanned video signals from such imagers.

A CCD field transfer imager has an A register exposed to illumination and has B and C registers masked from illumination. An image is projected into the A register during an image integration time to generate charge packets descriptive of fields of video samples. These charge packets are shifted to the B register during a field transfer interval in the subsequent vertical retrace period. The field of video samples thus stored in the B register is shifted to the C register one line each horizontal retrace period and is then read out serially during the ensuing horizontal trace period.

As the random noise in CCD imagers is reduced to levels making it feasible to use them in a broadcast-quality television camera system, it becomes desirable to obtain reference-black signals responsive solely to integrated dark current. Such reference-black signals can be differentially combined with image-responsive signals having undesirable accompanying integrated dark current responses to obtain image-responsive signals substantially free of integrated dark current response, which in the output signal of previous CCD imagers has been neglected since it has been of smaller amplitude than peaks of fixed-pattern noise. Anticipating such a trend in camera design, the present inventor has analyzed the nature of the dark current response of the field-transfer CCD imager in order to determine appropriate waveforms for the reference-black signals.

The dark current response of a field-transfer type of CCD imager is similar to that of other types of CCD imagers in the following respect. It has a direct component attributable to integratin of dark current over an image integration time in its image (A) register and to integration of dark current over each line time in at least one parallelly loaded, serially unloaded charge transfer channel used for parallel-to-series conversion of charge packets sampling image pixels to raster-scanned video output signal. The C register of the field-transfer CCD imager includes at least one such parallelly loaded, serially unloaded charge transfer channel, there being one such channel in a monochrome imager and up to three in an imager used with a color stripe filter.

The dark current response of a field-transfer type of CCD imager differs from that of other types of CCD imager in that the response includes, besides the direct component, a staircase component with line-length steps. This staircase component stems from remnant integrated dark currents in the charge transfer channels of the B register being displaced forward during field transfer intervals to make room for charge packets loaded serially into these channels from corresponding charge transfer channels in the A register.

Charge packets of remnant integrated dark current have been accumulated during the preceding integration time (or field trace interval) in the stages behind those containing charge packets that describe pixels of the preceding image field. At the end of the previous integration time the size of charge packets describing pixels of the accumulated integrated dark currents left behind in the succession of stages in each charge transfer channel of the B register increases incrementally in each stage, progressing from A register to C register along the charge transfer channel. During field transfer this staircase of remnant integrated dark currents is displaced from the image storing rows of the B register (and is completely or for the most part clocked out of the CCD imager assuming a design such as is in present use, in which B register length equals A register length). Accordingly, this staircase of remnant integrated dark current is not left in the rows of the B register storing image lines and so is not available to complement the staircase of integrated dark current generated during the new field by the process now to be described.

The time a charge packet describing an image sample is in the B register varies according to which line it is located in. The integrated dark current accumulated with this charge packet during the time it takes to go through the B register will vary proportionally with this time, supposing uniformity in the stages of the B register transfer channels, since the charge packet describing the image sample is not attended by remnant charge from integration of dark currents in the preceding field. So, as each successive line of image samples in an image field is transferred from the last row of the B register to the C register, it has an incrementally larger component of integrated dark current response than the line before, primarily owing to its having been in the B register for an additional line advance time.

This staircase component of dark current response in the video samples clocked out of the C register during picture interval causes a slope in average brightness from beginning of the image field to its end, as this field is described by the video samples from the CCD imagers. This slope in average brightness, or "field shading," will be objectionably noticeable to a viewer of a television display generated from these video samples, particularly when the televised images originate under low-illumination conditions. As semiconductor wafer uniformity is improved and random noise in imager pickup is reduced, the ability of the field-transfer CCD imager to operate at low illumination levels is further improved. Field shading then becomes a first-order limitation in faithful reproduction of an evenly illuminated scene.

The field shading attributable to dark current effects has its gradient perpendicular to the direction of line trace. In present CCD imager designs, there is no gradient along the direction of line trace, attributable to shading along the horizontal line, as one might expect to arise from passage of each line through the C register. The charge packets describing image field samples, or pixels, loaded into a charge transfer channel in the C register from the B register are "side-loaded." That is, they are loaded in parallel into the individual stages of the charge transfer channel in the C register. This is done in such way these charge packets add to integrated dark currents remnant in those C register stages. These remnant charges are from accumulation in the stages during the previous line trace period after image samples had been clocked past those stages. This addition to remnant integrated dark current in a parallelly loaded register (such as the C register), rather than replacement of remnant intergrated dark current as done in a serially loaded register (such as the B register), preserves a staircase of remnant charge which complements the staircase generated during subsequent stage-by-stage charge transfer through and out of the register.

Consequently, there is no staircase component of integrated dark current contributed by the parallelly loaded register to its output, only a direct component. That is, there is not integrated dark current staircase with pixel length steps generated in the C register of the field-transfer CCD imager which would, in its output signal, fill in between successive line-length steps of the integrated dark current staircase generated in the B register.

Viewed another way, the time from integrating dark current augmenting each charge packet passing through the C register is one horizontal line time, and the C register contribution to integrated dark current is a relatively small increase in the direct component of integrated dark current generated primarily in the A register. The percentages of direct component arising in the A and C registers are related, firstly, as image integration time to the time for one horizontal trace and retrace and, secondly, as the respective sizes of charge storage wells in those registers.

The field transfer operation does not affect the total time for accumulating the dark current charge accompanying an image pixel sample before that sample is clocked out of the B register. So, if the dimensions of the potential wells in the A and B registers are similar, it is immaterial whether dark current integration takes place in the A and B register during field transfer. That is, there is no effect on the accumulated dark current which depends on the order in which the sample appeared in the field transfer. It the wells in the A and B registers differ in size, there will be some effect on the relative sizes of the direct and sawtooth components. This effect is minor, especially since the field transfer interval is normally short compared to the image integration interval.

In a system embodying the invention, which includes a CCD imager of field-transfer type, a waveform is generated which changes through each field time at an average rate substantially equal to that at which integrated dark current changes in the video signal. The generated waveform is combined with the video signal produced by the imager to suppress integrated dark current changes in the modified video signal obtained as a result of the combining.

Figure 4:
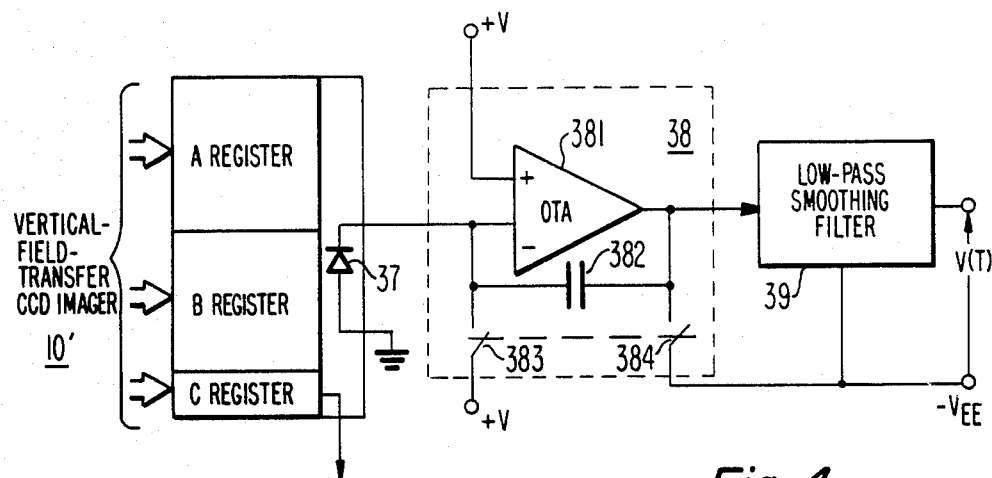
Figure 5:
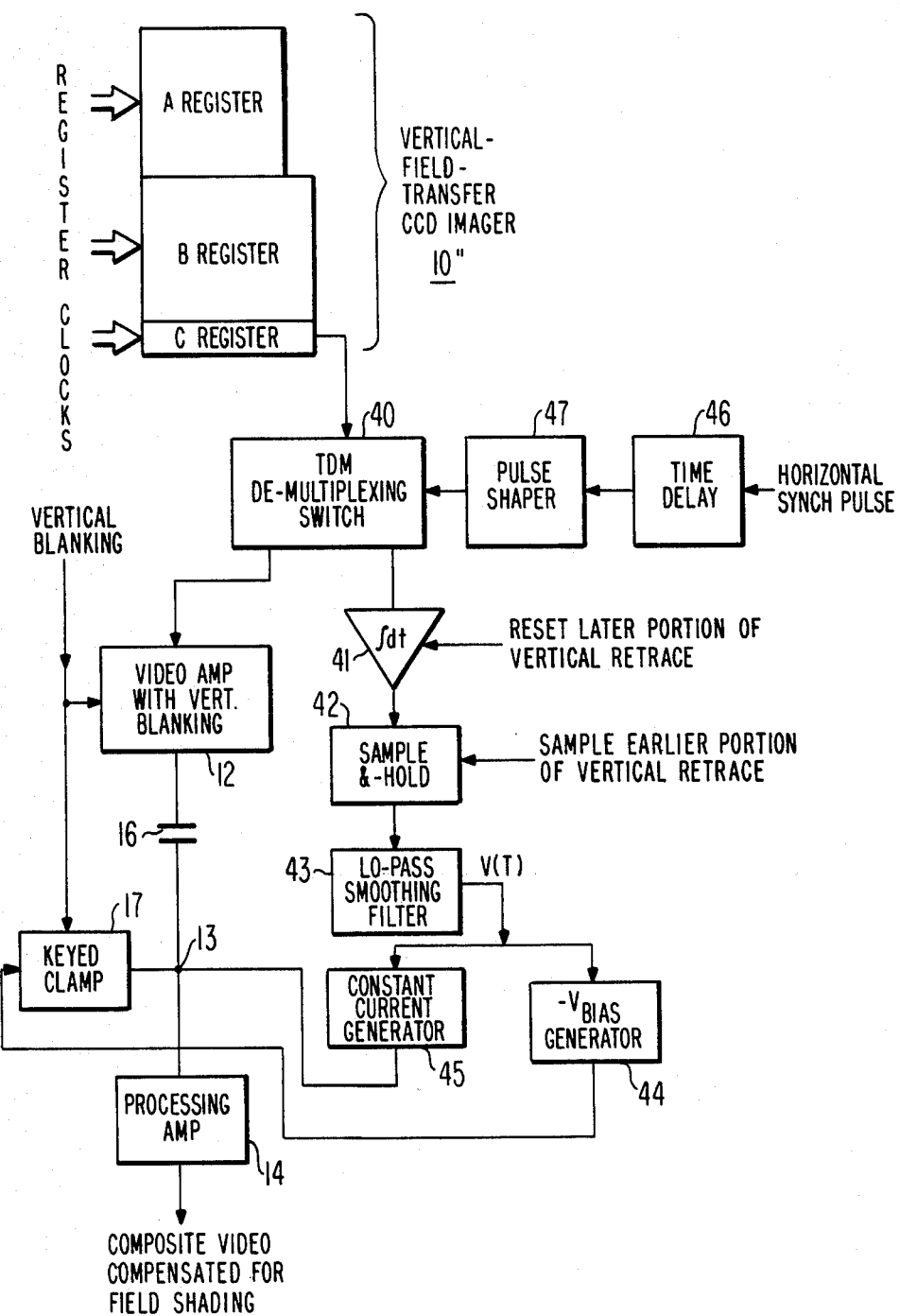
Figure 6:
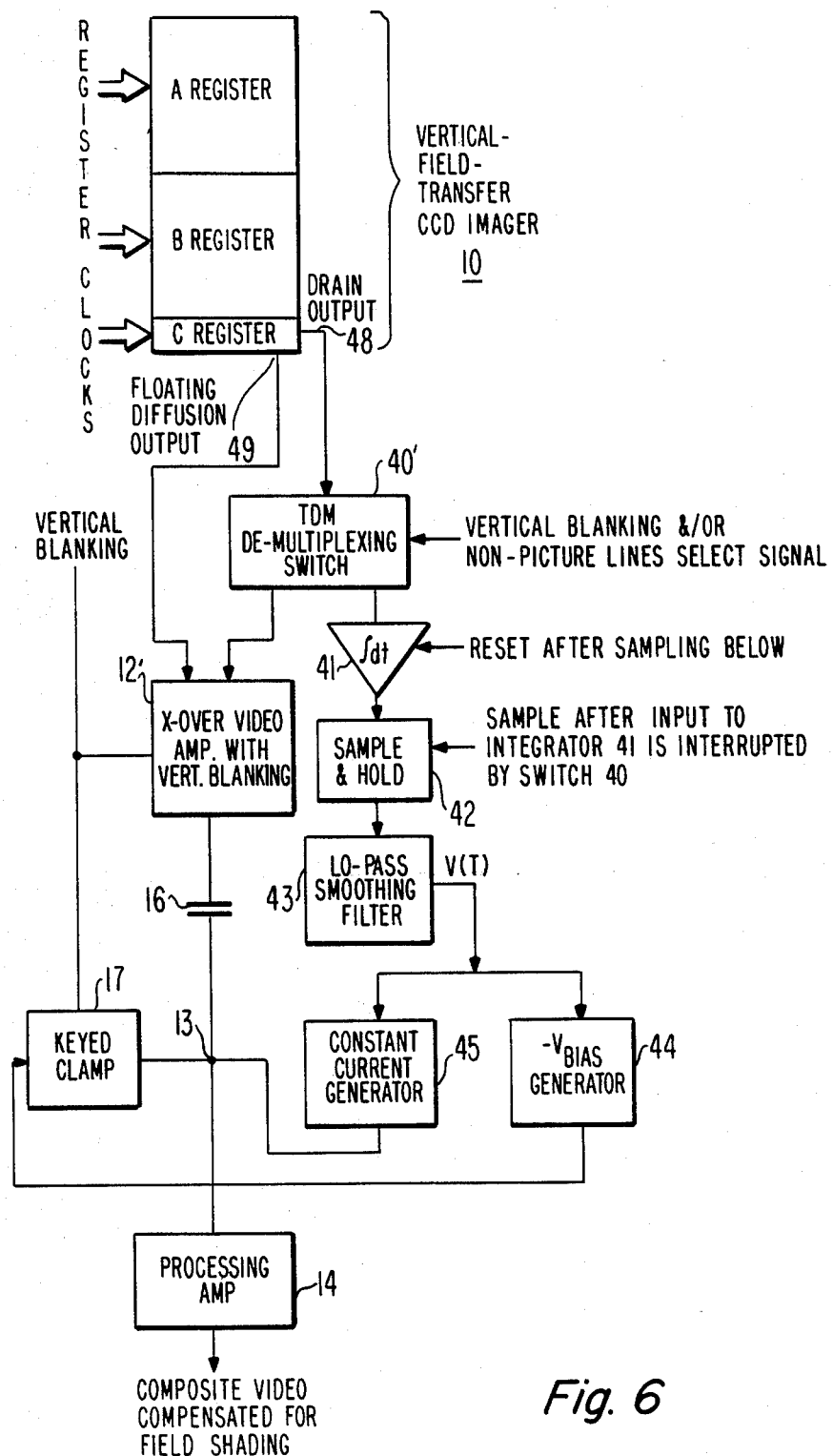

FIGS. 4, 5, and 6 are schematic diagrams of various ways of obtaining voltage for compensating for variations in imager dark currents in the circuitry of the earlier figures, in implementing further aspects of the invention; and each of FIGS. 7 and 9 is a schematic diagram of further camera apparatus embodying the invention.

Figure 1:
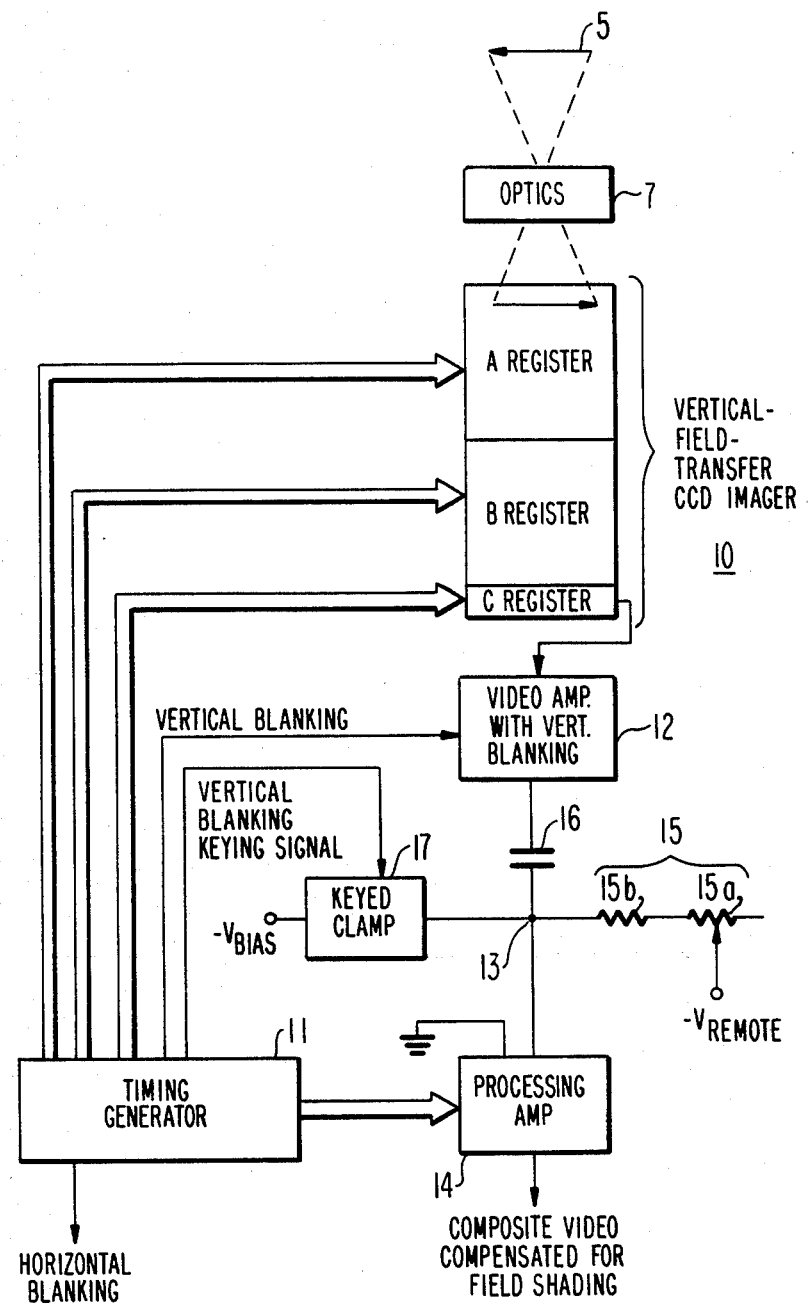
FIG. 1 is a schematic diagram of camera apparatus including a CCD imager of the field-transfer type followed by apparatus for compensating against field shading caused by dark currents in the CCD imager, which camera embodies the invention.

In FIG. 1 an image 5 is projected by the camera optics 7 into the A register portion of a field-transfer CCD imager 10. Imager 10 receives clocking signals for its A, B, and C registers in accordance with conventional practice from a timing generator 11, which also generates the timing signals usually used by the processing amplifier in a television camera--viz., horizontal and vertical synchronizing pulses, equalizing pulses, horizontal and vertical blanking signals, front and back porches, etc. The design of such timing generators conventionally includes a relatively high-frequency, crystal-locked master clock oscillator; counter chains for frequency division; and appropriate combinatorial logic. The C register of the CCD imager 10 conventionally includes circuitry for converting charge packets, which are descriptive of picture elements in the image provided to the A register of the imager, to voltage or to current for application to the input circuit of an ensuring video amplifier 12.

In the present invention, the video amplifier 12 is preferably of a type that uses dc restoration between stages, to clamp to a known level the black level pedestals that occur during line retrace. Further, video amplifier 12 is preferably of a type providing blanking of the CCD imager output during the field retrace interval to suppress spurious responses to the CCD imager output signal applied to the input connection of video amplifier 12--i.e., during vertical retrace intervals, assuming the camera generates raster-scanned video of normal orientation with horizontal line scan and vertical line advance. This blanking is provided responsive to vertical blanking signals supplied by timing generator 11 at times when both the A and B registers of CCD imager 10 are clocked to transfer a field of charge samples from the A register to the B register.

The output circuit of video amplifier 12 is ac-coupled to a node 13 at which the signal to drive the input circuit of a processing amplifier 14 appears. In processing amplifier 14 the horizontal and vertical synchronization interval "blocks" are inserted between lines of video supplied from CCD imager 10 via video amplifier 12, to generate a composite video output signal. Processing amplifier 14, commonly referred to as a "proc amp", is of conventional design and receives its timing signals from timing generator 11 in customary fashion. Reference black level at node 13 will be assumed as ground reference potential in this description of the invention.

Consider now the operation of those portions of the FIG. 1 apparatus which are used in compensating against field shading caused by dark currents in the CCD imager, in accordance with the invention. According to the invention, the ac-coupling of video amplifier 12 to processing amplifier 14 is made so as to weakly differentiate vertical-blanked video over a field time, to provide a change in dc voltage level as a function of time at 13 in a sense and amount to compensate for the staircase component of dark current introduced in the B register of imager 10 and any other factors which would otherwise cause field shading. Direct current restoration is subsequently made at the input circuit of processing amplifier 14. This dc restoration differs from conventional dc restoration done on a line-by-line basis; clamping to reference dc is done only once per field, at its start or just before its start during field retrace.

More particularly, the output circut of video amplifier 12 is shown as being resistively coupled to the input circuit of processing amplifier 14. The coupling network includes a coupling resistance 15 and a dc-blocking capacitor 16. Resistance 15 is of adjustable rheostat 15a and a stop resistor 15b from node 13 to a remote negative voltage $-V_{REMOTE}$. Capacitor 16 is the dc blocking capacitor between the output circuit of video amplifier 12 and the input circuit of processing amplifier 14. Capacitor 16 has a capacitance C and forms a weak differentiator with coupling resistance 15 so as to remove field shading from the video signal appearing across coupling resistance 15. The input load resistance of processing amplifier 14 is substantially higher than R, the value of coupling resistance 15, and may be neglected. The time constant RC of the differentiator 15, 16 is chosen not too many times longer than the field duration, to obtain the weak differentiation. The time constant is such that the exponential decay voltage level across the coupling resistance takes place over a few field times and so approximates a linear decay through a single field, as needed to compensate for field shading. The voltage $-V_{REMOTE}$ is substantially more negative than the voltage $-V_{BIAS}$ so the difference between them greatly exceeds peak-to-peak video variation. This is done so the decay of voltage across coupling resistance 15 is essentially unaffected by video variations.

In the field shading attributable to dark current integration, the earilier portions of the field is least bright, so the decay owing to the weak differentiation is arranged to be black-going. E.g., assume white-to-black voltage transistions in the output circuit of video amplifier 12 to go negative in potential, and processing amplifier 14 to be arranged to operate with positive-input voltages as referred to reference black level, as well as assuming reference black level at the reference ground against which $-V_{REMOTE}$ is referred. During the vertical retrace interval a keyed clamp 17 responds to vertical blanking signal from timing generator 11 applied as keying signal to clamp node 13 to a bias voltage $-V_{BIAS}$. During the following field trace the voltage at node 13 will, upon termination of vertical blanking, exhibit a slight positive step attributable to dark current integrated over a field time in the A register and over a line time in the imager C register. The positive step is compensated against by $-V_{BIAS}$ being sufficiently negative respective to reference black level to place node 13 close to reference black level at beginning of field scan. Then, owing to bleeding of current from node 13 to remote through coupling resistance 15, the voltage at node 13 proceeds to ramp nearly linearly towards remote.

Adjustment of the value R of the coupling resistance 15 by adjusting rheostat 15a adjusts the rate of downward ramping to compensate for field shading. The degree of field shading caused by integrated dark currents is sensitive to the temperature of the CCD imager 10, particularly to the temperature of its B register, so readjustment of rheostat 15a will be required from time to time. This sensitivity arises because dark current varies with temperature.

Figure 2:
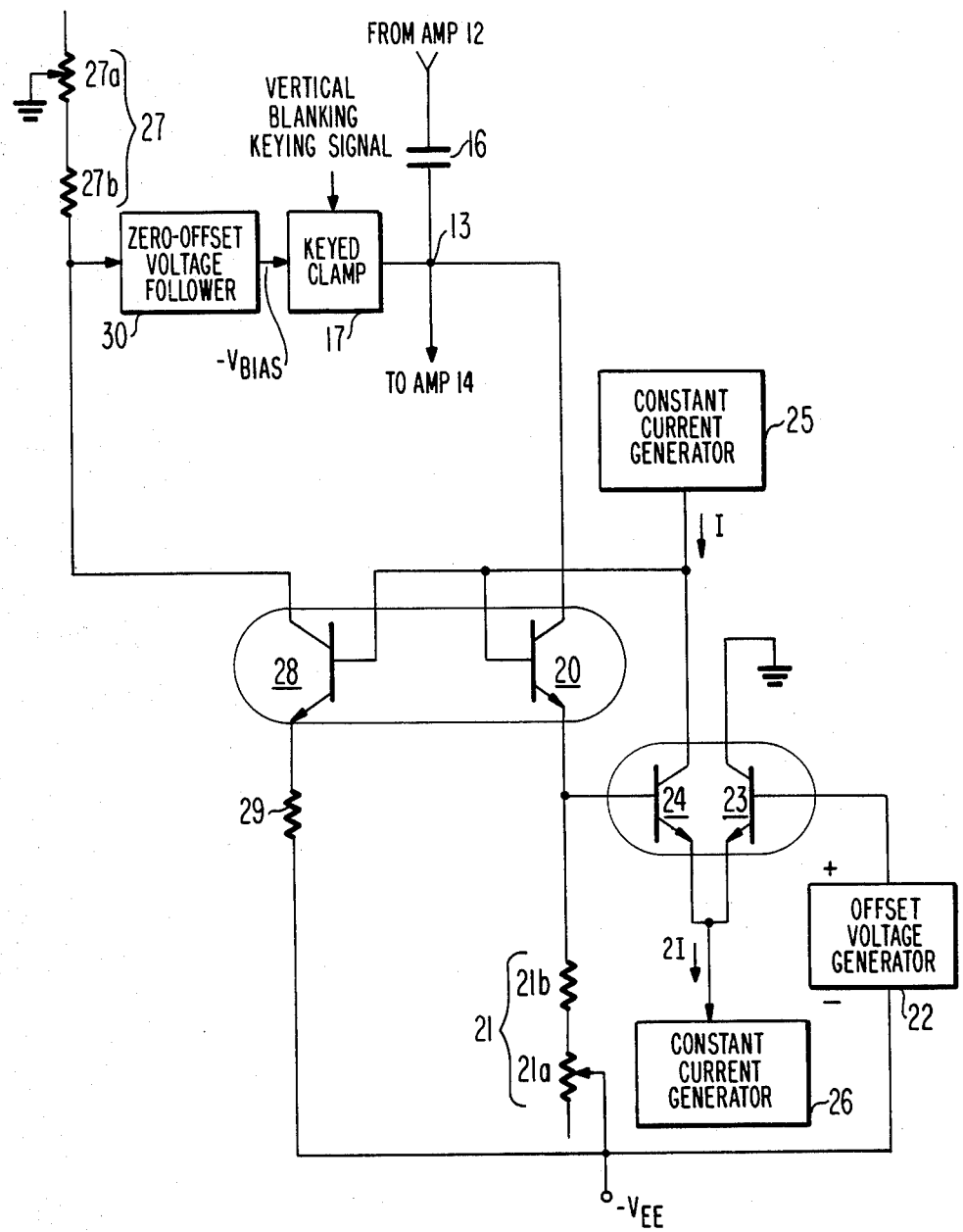
FIGS. 2 and 3 are schematic diagrams of modifications that can be made to the FIG. 1 apparatus for compensating against field shading.

FIG. 2 shows a modification to the FIG. 1 circuitry wherein the ramp discharge of capacitor 16 through the field is responsive to the continuous demand for collector current made by transistor 20, operating as a constant current generator, rather than through bleeder resistance 15. This is advantageous in that the negative supply $-V_{EE}$ need not be so remote as $-V_{REMOTE}$ from reference black level in order to achieve ramp linearity, both from the standpoint of reducing signal variations on discharge rate and from the standpoint of reducing error owing to logarithmic approximation of linear discharge. To operate transistor 20 so its collector connection provides constant current generator operation, its emitter is connected by resistance 21 to $-V_{EE}$ and its base is biased to place constant voltage across resistance 21. The emitter current of transistor 20 is determined by Ohm's Law to be the voltage $V_{21}$ (not labelled in the drawing) across resistance 21 (between the emitter of 20 and the $V_{EE}$ terminal), divided by the resistance $R_{21}$ between the same points; and the collector current of transistor 20 is by common-base-amplifier action $\beta/(\beta+1)$ times as large—i.e., essentially the same, in the usual case where the common-emitter forward current gain $\beta$ is high. Resistor 21 is shown as comprising a rheostat 21a and stop resistor 21b in series connection. $V_{21}$ can be regulated to equal an offset voltage respective to $-V_{EE}$ supplied from offset generating circuitry 22 in a variety of ways, without error being introduced by the emitter-to-base voltage of transistor 20.

In the way shown in FIG. 2, the offset voltage is applied to the base of one (23) of two transistors 23 and 24 in long-tailed-pair configuration, and the emitter of transistor 20 is connected to the base of the other. The collector of this other transistor 24 connects to the base of transistor 20 to complete a degenerative feedback loop that regulates the collector current demanded by transistor 23 to equal the current I supplied by constant current generator 25 less the negligibly small base currents of transistors 20 and 28. Making the tail current demanded by constant current generator 26 from the joined emitters of transistors 23 and 24 twice as large, forces transistors 23 and 24 to have similar emitter currents, which causes their emitter-to-base voltages to be essentially equal. The difference between their base voltages can be minimizes by using matched transistors mounted on the same header or by using adjacent transistors in a monolithic intergrated circuit.

Particularly where the amplitudes of $-V_{BIAS}$ and of the constant current demand at the collector of transistor 20 are to track each other with temperature, it may be advantageous to develop $-V_{BIAS}$ equal to the voltage drop developed across a resistance 27 responsive to current proportional to the collector current of transistor 20. To this end, the voltage applied to the base of transistor 20 is applied to the base of transistor 28. Transistor 28 has its emitter connected via resistance 29 to $-V_{EE}$ and accordingly demands a collector current related to that of transistor 20 in the same ratio as the conductances of their respective emitter resistances. The collector current demand of transistor 28 is satisfied from ground through resistance 27, shown as comprising the series connection of a rheostat 27a and stop resistor 27b. The $-V_{BIAS}$ drop across resistance 27 can be adjusted by varying rheostat 27a resistance. A zero-offset voltage follower 30 receptive of the $-V_{BIAS}$ supplies the same potential at low source impedance for keyed clamp 17 to clamp against.

The continual discharge of capacitor 16 will cause some change in black level along each scan line, but not enough to be perceptible (or at least readily so) to a viewer of a television display supported by video originating from the FIG. 1 camera, or from that camera modified to replace coupling resistance 15 by a constant current generator like that provided at the collector of transistor 20 in FIG. 2. However, this change in black level along each scan line can be avoided by arranging staircase discharge rather than ramp discharge of capacitor 16.

Figure 3:
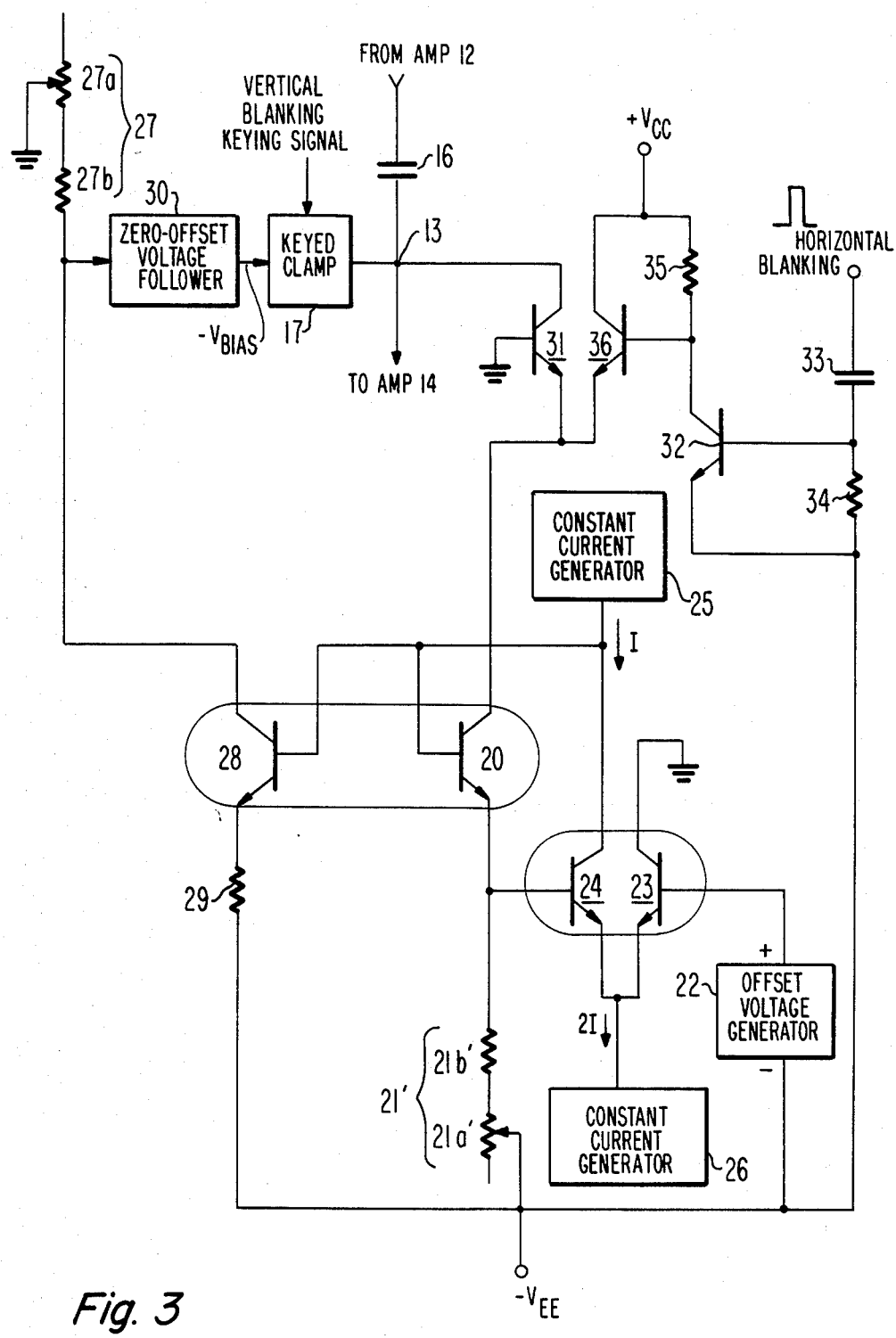

FIG. 3 exemplifies how this may be done. The collector of transistor 20 is not continuously connected directly to node 13, but rather is selectively connected by common-base-amplifier action of transistor 31. This action obtains only during horizontal blanking intervals. In these intervals blanking pulses applied to the base of transistor 32 via dc-blocking capacitor 33 lift its base potential, otherwise pulled down close to $-V_{EE}$ by resistor 34. Conduction of transistor 32 causes potential drop across its collector resistor 35, pulling the base of transistor 36 to $-V_{EE}$. The emitter of common-collector transistor 36 is held to ground except for the base-to-emitter offset of transistor 31, so the emitter-base junction of transistor 36 is reverse-biased and transistor 36 is non-conductive. Consequently, the collector current demand must be entirely satisfied from the emitter of transistor 31, which satisfies this demand nearly entirely by demanding collector current in turn from node 13. This collector current causes the steep "riser" portions of the staircase discharge of capacitor 16.

During line scan, resistor 34 pulls the base of transistor 32 towards $-V_{EE}$, biasing transistor 32 out of conduction. Absent collector current demand by transistor 32 to cause potential drop across resistor 35, this resistor pulls the base potential of transistor 36 up to $+V_{CC}$, a positive voltage respective to ground. The emitter potential of transistor 36 follows its base potential with a base-to-emitter offset, reverse-biasing the emitter-base junction of grounded-base transistor 31 and interrupting its conduction. Transistor 31 demands no collector current from node 13 and capacitor 16 discharge halts during line scan, to provide the flat "tread" portion of the staircase discharge. Resistance 21', provided by rheostat 21a' and stop resistor 21b', is substantially lower than resistance 21 of FIG. 2 to allow the charge on capacitor 16 to be altered the same amount per line as was done in FIG. 2, despite the alteration taking place during only a portion of the line, rather than continuously as was done in the FIG. 2 circuit.

Variants of the FIG. 3 circuit wherein the base of transistor 31 is biased to a voltage between ground and $-V_{EE}$ and wherein the base of transistor 36 is swung just a bit positive respective to this voltage during horizontal blanking are possible. In such case the collector current of transistor 36 may be used to develop potential drop across resistance 27 to generate $-V_{BIAS}$, and transistor 28 and resistor 29 may be dispensed with.

Thusfar, the problem of causing $-V_{BIAS}$ and the discharge current of transistor 20 to track the changes in dark current integrals as a function of the temperature of the CCD imager has not been treated. Such temperature-tracking, in accordance with further aspects of the invention, eliminates the need for frequent readjustment of rheostatic controls (e.g., 15a, or 21a and 27a, or 21a' and 27a). In the FIG. 1 circuitry modified per FIG. 2 or 3, such temperature-tracking will be provided if the voltage supplied by offset voltage generator 22 is a temperature-dependent voltage V(T) which varies in proportion to imager dark current as integrated over a field interval. There are a number of ways to generate such a V(T).

In the embodiment of the invention shown in FIG. 4, CCD imager 10' includes in the surface of its substrate of semiconductive material a semiconductor junction 37. This junction is employed in the manner to be described to generate a time varying voltage which compensates for the staircase component of the dark current produced in the B register. In more detail, the reverse current or dark current of this junction is integrated over time by integrator 38 with output periodically reset to $-V_{EE}$, the resulting sawtooth output voltage of which integrator 38 is filtered by a low-pass smoothing filter 39 to obtain a substantially direct voltage V(T) referred to $-V_{EE}$. Reset of integrator 38 output to $V_{EE}$ is conveniently done during line retrace, for example. Integrator 38 is shown, by way of example, constructed using a differential-input operational transconductance amplifier (OTA) 381 with an integrating capacitor 382 between its output terminal and its inverting terminal, from which inverting terminal the reverse current of semiconductor junction 37 is withdrawn. Reverse biasing of semiconductor junction 37 is arranged for by continuous connection of the non-inverting input terminal of OTA 381 to a positive voltage $+V$, and by selective connection of its inverting input terminal to $+V$ using a keyed clamp synchronous with the keyed clamp of its output terminal to $-V_{EE}$ to reset integrator 38 output level. These keyed clamps are illustrated as poles 383 and 384 of a double-pole single-throw switch, though in actuality they will be electronic switches responsive, for example, to pulses supplied during line retrace from timing generator 11 (not here shown).

Alternatively, rather than employing a diode such as 37 as the basis for producing a compensating waveform, a large-area depletion region (not shown) may be provided in the CCD imager expressly for the integration of dark current, its area being in known ratio to the areas of the depletion regions in the A and B register charge transfer channels. This large area depletion region can be arranged as the initial storage well in a CCD charge transfer channel having only a single stage or two, separate from the CCD imager A, B, and C registers; and a voltage proportional to the dark current integrated in this storage well can be sensed using, for example, a floating gate sensor. This sensed voltage can be supplied from a different terminal of the CCD imager than its output terminal used for supplying signal from its C register and translated to provide V(T) referred to $-V_{EE}$. Or this sensed voltage may be time-division-multiplexed with C register output voltage within the CCd imager, so it can be supplied from the same imager output terminal. In such case another time-division-demultiplexer located external to the CCD imager can then be used to separate the multiplexed signals and the separated sensed voltage can be translated to provide V(T) referred to $-V_{EE}$.

Rather than a large-area depletion region being used for accumulation of dark current, a charge transfer channel having several stages operated as a clocked register may be used for the accumulation. This allows the time-division-multiplexing in the CCD imager C register of packets of accumulated dark current, which are to be used to generate V(T) in accordance with the present invention, with charge packets originated in the A register. In a U.S. patent application Ser. No. 382,423 filed May 27, 1982 entitled Field-Transfer CCD Imagers with Reference-Black-Level Generation Capability and assigned like the present application to RCA Corporation, Delbert Dean Crawshaw describes a new CCD imager of the field transfer type, which employs this kind of time-division multiplexing in furtherance of schemes for suppressing field shading different from those of the present invention. In Crawshaw's CCD imager the B register is provided with at least one charge transfer channel in addition to those supplied with charge packets from a respective one of the charge transfer channels in the A register. Each additional charge transfer channel respectively supplies one sample of integrated dark current at the start of each line of video clocked out of the C register. The time over which the dark current is integrated to form each such charge sample is the time from the start of the field until the start of that line.

FIG. 5 shows how the essentially direct voltage V(T) can be generated when a CCD imager 10" of this type is used. The B register, illustrated by a larger box than the A register, has the extra channel or channels, as discussed above, which do not receive charge from the A register and therefore accumulate only the charge due to dark current generation. A time-division-multiplex de-multiplexing switch 40 is used to separate the responses to the integrated-dark-current charge samples produced in the extra channel(s) of the B register, as they appear in the CCD imager output signal from responses to other charge samples clocked through the C register, those which contain charge originating from the A register. A separated sample of integrated dark current from the last line of video is the dark current of an individual charge transfer stage integrated over a field time, and the separated samples of integrated dark current from the preceding lines are proportional to this integral. Separated samples from one line of video can, in accordance with one embodiment of the invention, be separated and held for a field time to provide V(T).

FIG. 5, however, shows apparatus in which a more representative estimate of the integrated dark currents of CCD imager 10" A and B registers is derived and is therefore preferred to the approach just discussed. The separated dark current samples from each line are integrated over a field time in an integrator 41. Sample-and-hold circuitry 42 samples the integral developed by integrator 41 during each vertical retrace interval, and integrator 41 is then reset to $-V_{EE}$. The output voltage of sample-and-hold circuitry 42 is essentially the V(T), as referred to $-V_{EE}$, sought. It may be smoothed over several fields using a low-pass filter 43, as shown, to develop V(T). V(T), the direct potential used as a basis for generating the time-varying voltage used to compensate against field shading is shown applied to $-V_{BIAS}$ generator 44 for generating the voltage against which keyed clamp 17 clamps and to constant current generator 45 for generating capacitor 16 discharge current. The circuitry of generators 44 and 45 may be integrated together as described above in connection with FIGS. 2 and 3.

The control signal for demultiplexing switch 40 is developed easily by one skilled in the art of designing television broadcast equipment. For example, horizontal synchronizing pulses can be suitably delayed and shaped using time delay circuitry 46 and pulse shaper circuitry 47.

Another aspect of the invention is based on the insight that the charge left in the B register of a field-transfer CCD imager, after a field of charge packets supplied from the A register has been clocked out of the B register, provides a measure of integrated dark current. Half the charge attributable to integrated dark currents accumulated in the B register during field trace remains in the B register at end of field, trace, apportioned between the charge transfer channels of the B register. In each charge transfer channel an ascending staircase of integrated dark current is left behind in the successive stages between the A and C registers. It is found to be very advantageous to use this residual integrated dark current as a basis for suppressing dark current response in the video ouput from a camera using a field-transfer type of CCD imager. One reason is that it is not necessary to take up any additional area on the CCD imager semiconductor die. The B register occupies as much as nearly half the semiconductor die, and substantially half the integrated dark current accumulated over a field time remains in the B register at end of the field integration time. So this is a larger amount of charge than can be conveniently accumulated on the CCD imager die by other means. This charge is removed via the C register during field transfer and discarded, if one follows a previous practice of the inventor and his co-workers.

Rather than discarding this charge it can be, in accordance with an aspect of the present invention, removed via the C register during field transfer and integrated to generate V(T). This is done using the same sort of apparatus as in FIG. 5, except for elements 46 and 47 being dispensed with, and except for demultiplexing switch 40 being supplied control signal so it separates the CCD imager ouput during field transfer interval for application to the input of integrator 41.

In prior art CCD imager practice the C register is run during field transfer time. This avoids unwanted blooming in the first few lines of video in the picture portion of a field, which would otherwise be caused by overfilling of the C register with integrated dark current forcing spill-back of charge into the last row or last few rows of the B register. A CCD imager modified to include more rows in the B register than in the A register is used in embodiments of the invention now to be described, in which the C register clocking is halted during field transfer interval. If C register clocking is halted in such phase that charge can be admitted to the C register, the C register will overfill with integrated dark current and the excess will spill back into the extra rows in the B register. If C register clocking is halted in such phase that charge cannot be admitted into the C register, the accumulated integrated dark current will be held back entirely in the extra rows of the B register. The spilled back or held back charge will appear in the video signal output of the CCD imager in non-picture lines at the start of the new field. Typically, in such operation, at room temperature the charge storage wells in one or two of the extra rows in B register will be filled with integrated dark current, and the charge storage wells in the next extra row will be partially filled. For every 10° C. rise in the CCD imager operating temperature, the amount of integrated dark current held back doubles, approximately doubling the number of extra rows in B register required for storing that change. The total integrated dark current left in the B register at end of an integration time and held back or partially held back and partially spilled back by not clocking the C register during field transfer is used, as the basis for generating V(T) by integration in certain embodiments of the present invention. Though spill-back or hold-back of charge packets results in their temporal displacement, the subsequent time integration of this charge makes this of no consequence.

An apparatus which operates this way is the same as that shown in connection with imager 10" in FIG. 5, except for elements 46 and 47 being dispensed with, and except for demultiplexing switch 40 being supplied different control signal. This control signal is such as to condition switch 40 to apply the first few, non-picture lines of the field to the input of integrator 41.

FIG. 6 shows apparatus, preferred over these modifications of the FIG. 5 apparatus, for generating V(T) from the remnant charge left in the B register of a prior art field-transfer CCD imager 10 at the end of field integration time. In the FIG. 6 apparatus the total charge left in the B register, after a field of charge samples that originated in the A register has been clocked out through the C register, is moved out through the C register to a drain connection 48 of imager 10. This occurs during that portion of field retrace time that charge samples are transferred from A register to B register, or in the non-picture lines at the beginning of field scan, or in both time periods. De-multiplexing switch 40' is used as a gating circuit to route this charge from the drain connection 48 to the input of integrator 41 at the appropriate time.

The FIG. 6 arrangement is a preferred one since it facilitates video amplifier 12' being of a type providing cross-over response to high-frequency portions of signals supplied from imager 10 via a floating diffusion output connection 49 and to low-frequency portions of the signals supplied from imager 10 via the drain connection 48. (More particularly, these low-frequency portions of the signals are here selectively supplied from the drain connection 48 to video amplifier 12' by de-multiplexer switch 40', the supplying being done during the portion of field scan containing picture lines.) Taking high-frequency video response from a floating diffusion ouput and taking low-frequency video response from a drain connection results in the video amplifier 12' being able to supply a composite video signal to node 13 via dc-blocking capacitor 16, which has low accompanying noise, for reasons previously taught by S. L. Bendell P. A. Levine in their U.S. Pat. No. 4,435,730, issued Mar. 6, 1984, entitled Low Noise CCD Output, and assigned like the present application to RCA Corporation.

Before the Bendell and Levine work, there had been a recent tendency away from developing input for processing amplifier 14 using video samples supplied from the drain connection 48, because of relatively poor high frequency response, in favor of using video samples originating solely from a floating gate or a floating diffusion. In such case, where video samples are not taken rom drain connection 48, the FIG. 6 apparatus can be modified, replacing video amplifier 12' with the more conventional video amplifier 12 supplied input from the normal video output of the CCD imager 10, and using a simpler gating circuit between drain connection 48 of the CCD imager 10 and the input connection of integrator 41.

The FIG. 5 and FIG. 6 configurations and their variants can be modified so that integrator 41 is reset more or less frequently than once per field. The timing of sample and hold circuit 42 sampling time is then altered to occur just before each reset, and the roll-off frequency low-pass filter 43 is adjusted to adequately suppress the fundamental of the sampled and held integrator output. Arranging for integrator 41 to be reset more frequently than once per field allows lower-reactance elements to be used in smoothing filter 43.

FIG. 7 is an example of the other ways that may be used to linearly combine the ramp or staircase with video signal to suppress field shading attributable to integrated dark currents. In FIG. 7 one of the inputs of a differential-input amplifier is supplied video, with negative-going whites and with field shading, from a chain 51 of field transfer CCD imager and video amplifier. The other of its inputs receives input from a ramp voltage generator 52, which includes circuitry resembling that of FIG. 2 except that the compensating waveform, with amplitude comprising a black-going ramp voltage summed with the black pedestal voltage $V_{BIAS}$, is developed against ground, rather than field-shaded video from a video amplifier. (The circuitry 53 to develop V(T) may be as described above.) The common-mode rejection of differential amplifier 50 suppresses field shading in the video ouput it supplies to the input of processing amplifier 14.

Linearly combining the video with field shading and the field-shading compensation waveform using the differential-input amplifier 50 is advantageous in the following regard. In-band noise can be conveniently skimmed off the compensating waveform with a smoothing filter 54 interposed after the ramp generator 52 in its input to amplifier 50, without interfering with frequency response in the video supplied to the other input to amplifier 50. Further, the video amplifier in chain 51 need not be provided vertical blanking.

In a variant of the FIG. 7 apparatus, ramp generator 52 is replaced by a waveform generator generating a ramp superimposed on a black pedestal, derived from the FIG. 3 circuitry in a manner analogous to ramp generator 52 being derived from the FIG. 2 circuitry.

Figure 8:
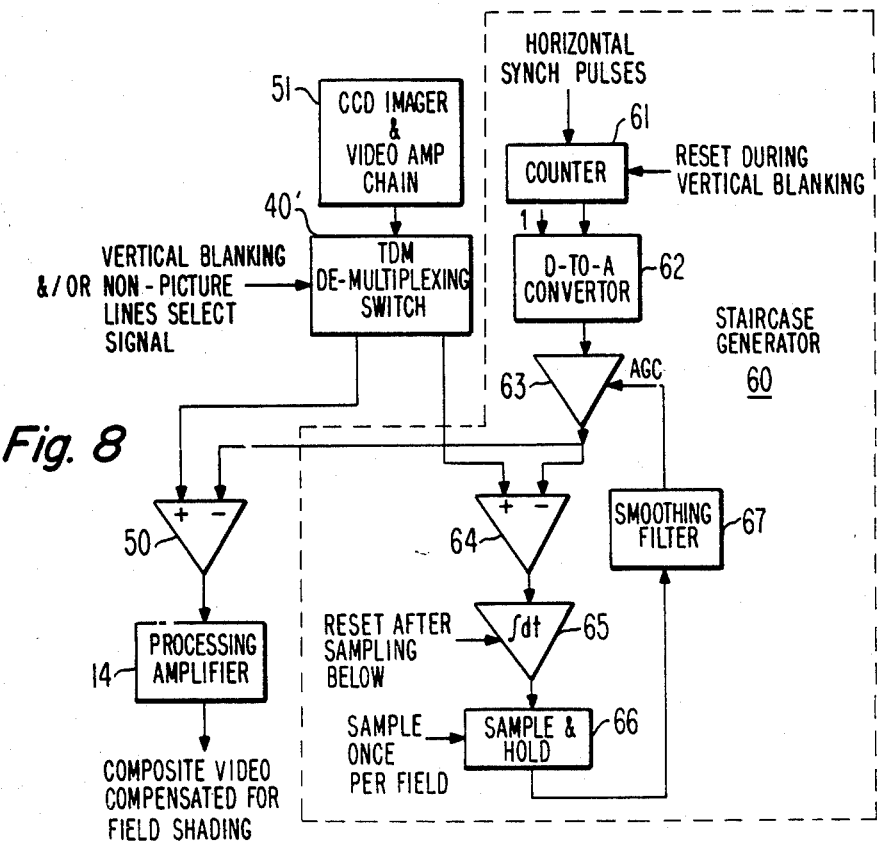

FIG. 8 shows apparatus that exemplifies how the gain adjustments of the FIG. 7 apparatus and its variants can be avoided. The CCD imager and video amplifier chain 51 output signal is applied to TDM de-multiplexing switch 40'. Switch 40' directs the picture lines of chain 51 output signal to the non-inverting input of differential-input amplifier. The inverting input of amplifier 50 receives a staircase waveform from staircase generator 60, which suppresses response to integrated dark current in the video signals supplied from the output of amplifier 50 to the input of processing amplifier 14. The staircase generator 60 includes a counter 61 counting the horizontal synch pulses during each field scan and being reset during vertical blanking. Generator 60 also includes a digital-to-analog converter 62 for converting the count as a fraction added to unity to a black-going staircase superimposed on a black pedestal. This constant amplitude waveform is passed through a controlled-gain amplifier 63 to supply automatic gain controlled (AGC'd) staircase input signals for the inverting inputs of amplifier 50 and of another differential-input amplifier 64, located in generator 60.

Switch 40' directs the integrated dark current extracted from the B register after the charge packets describing picture lines to the non-inverting input of differential-input amplifier 64, having its output connected to the input an integrator 65. Integrator 65, reset once per field, responds to supply the time integral of the difference of the AGC'D staircase output waveform of generator 60 and the response to integrated dark current remnant in the B register after picture lines have been clocked out for each image field. This integral is sampled just prior to resetting of integrator 65 by sample and hold circuitry 66 to develop a signal which passed through a smoothing filter 67 is applied as automatic gain conrol (AGC) signal to gain-controlled amplifier 63.

Operation of the FIG. 8 apparatus is based upon the total charge comprising integrated dark current remnant in the B register after all charge packets descriptive of picture lines having been clocked out being equal to the total charge in the integrated dark current accompanying those clocked out charge packets. By making the time integral of the compensating staircase waveform equal to the time integral of the response to this remnant charge as received from one output of switch 40', it should then equal the time integral of the undesirable integrated dark current response accompanying the picture video. Since this undesirable response and the compensating staircase waveform are synchronous in waveform variation because of being analogously generated, if their time integrals are caused to be equal, their instantaneous values perforce are equal and will cancel each other in a differential combining process, such as that which takes place in amplifier 50.

One way to AGC'ing the amplitude of the compensating staircase waveform is to use degenerative feedback to reduce the difference between the time integrals of the compensating staircase waveform and of the response to remnant charge left in the B register after picture lines are clocked out. The possibility of the gains of two integrators preceeding a differential combining process differing makes it difficult to eliminate gain adjustments, however. The difference between two time integrals of time functions that are separable variables of time can, however, be found indirectly by taking the time integral of the differences of these functions, to obviate the need for making adjustments of relative integrator gains. This alternative way of developing AGC signal is implemented using the cascade connection of differential-input amplifier 64 and integrator 65 in FIG. 8.

Variations in black level of one or two IRE units can be acceptable in a video signal to be used in a black-and-white camera used for surveillance or other application, less critical than a broadcast color television camera. So in such a camera, the temperature compensation of $V_{BIAS}$ or its matching to integrated dark current from the CCD imager A register can be dispensed with in modifications of the apparatuses described above, while using the invention for suppressing variations in black level across the field.

What is claimed is:

1. In combination:
   a CCD imager of field transfer type for supplying fields of video samples in raster scan order as video signal, responsive to images projected into an unmasked image register thereof, the fields described by the video samples undesirably having field shading attributable to integrated dark currents;
   means for generating a waveform having the same average slope through a field interval as said field shading attributable to integrated dark currents, said means including
   means for generating a ramp as the varying portion of said waveform; and
   means combining said waveform with said video signal for suppressing said field shading attributable to integrated dark currents.

2. In combination:
   a CCD imager of field transfer type for supplying fields of video samples in raster scan order as video signal, responsive to images projected into an unmasked image register thereof, the fields described by the video samples undesirably having field shading attributable to integrated dark currents;
   means for generating a waveform having the same average slope through a field interval as said field shading attributable to integrated dark currents, said means including
   means for generating a staircase as the varying portion of said waveform; and
   means combining said waveform with said video signal for suppressing said field shading attributable to integrated dark currents.

3. In the combination of
   a CCD imager of field transfer type for supplying fields of video samples in raster scan order as video signal, responsive to images projected into an unmasked image register thereof, the fields described by the video samples undesirably having field shading attributable to integrated dark currents;
   means for generating a waveform having the same average slope through a field interval as said field shading attributable to integrated dark currents; and
   means combining said waveform with said video signal for suppressing said field shading attributable to integrated dark currents, the improvement wherein said combination further includes:
   means for developing a measure of the integrated dark current supplied from said CCD imager over a field time, and wherein said means for generating a waveform includes:
   means controlling the amplitude of said waveform responsive to that measure for providing suppression of field shading attributable to integrated dark currents, which suppression is compensated for temperature changes of said CCD imager.

4. In a combination as set forth in claim 3, said means for generating a waveform comprising means for generating a ramp as the varying portion of said waveform.

5. In a combination as set forth in claim 3, said means for generating a waveform comprising means for generating a staircase as the varying portion of said waveform.

6. A combination as set forth in claim 1, 2 or 3 wherein said means for combining said waveform with said video signal comprises:
   a differential-input amplifier having an output connection and having inverting and non-inverting input connections;
   means for applying said waveform to one of those input connections; and
   means for applying to the other of those input connections said video samples having undesirable field shading attributable to integrated dark currents, whereby the output connection of said differential-input amplifier is conditioned to provide video output with suppressed field shading attributable to integrated dark currents.

7. A combination as set forth in claim 6 wherein said means for applying said waveform includes a smoothing filter for reducing in-band noise in the video output from said differential-input amplifier.

8. In combination:
   a CCD imager of field transfer type for supplying fields of video samples in raster scan order as video signal, responsive to images substantially continuously projected thereinto, the fields described by the video samples undesirably having field shading attributable to integrated dark currents;
   a video amplifier having an input connection for receiving video signal from said CCD imager and having an output connection for supplying amplified video signal;
   means for providing field retrace blanking of said amplified video signal;
   a dc-blocking capacitor having a first plate to which the output connection of said video amplifier is made and having a second plate at which amplified video signal with suppressed field shading attributable to integrated dark currents is to be caused to appear; and means for causing said amplified video signal to appear with suppressed field shading, including means for supplying a bias voltage as referred to a reference voltage, including means for synchronously clamping the second plate of said dc-blocking capacitor to said bias voltage during each field retrace interval, and including means for conducting current at constant average rate to or from the second plate of said dc-blocking capacitor, in such direction as to suppress at the second plate of said dc-blocking capacitor the field shading component of video signal attributable to integrated dark currents.

9. A combination as set forth in claim 8 wherein said means for conducting current at constant average rate comprises resistance connected between said second plate of said dc-blocking capacitor and a point referred in potential to said reference voltage, the RC time constant of said resistance and dc-blocking capacitor being longer than a field time.

10. A combination as set forth in claim 8 wherein said means for conducting current at constant average rate comprises a constant current generator.

11. A combination as set forth in claim 10 wherein said constant current generator is of a type that generates a continuous direct current.

12. A combination as set forth in claim 10 wherein said constant current generator is of a type that generates a pulse of current during each line retrace interval.

13. A combination as set forth in claim 10, 11, or 12 wherein said constant current generator includes means responding to the integrated dark current of said CCD imager for proportionally controlling the value of current said constant current generator generates.

14. A combination as set forth in claim 13 wherein said means for supplying a bias voltage includes means responding to the integrated dark current of said CCD imager for proportionally changing the value of said bias voltage.

15. In combination:
a CCD imager of the field transfer type having a plural-row field storage register masked from incident radiation;
means for separationg the output of said CCD imager into fields of video samples in raster scan order and into intervening intervals of output signal; and
means for separating the output signal present during each of said intervening intervals to obtain a measure of integrated dark currents in said fields of video samples, that measure being obtained from response to remnant charge transferred out of said field storage register after each field of charge packets descriptive of video samples has been transferred out.

16. In combination:
a CCD imager of the field transfer type;
means for separating the output of said CCD imager into fields of video samples in raster scan order and into intervening intervals of output singal;
means for integrating the output signal present during each of said intervening intervals to obtain a measure of integrated dark currents in said fields of video samples;
means for generating a waveform having a controllable average slope through each field interval;
means for controlling that slope responsive to said measure of integrated dark currents; and
means for combining said waveform with the video signal formed from said video samples to provide a video signal with suppressed field shading.

17. A combination as set forth in claim 16 including:
means for adding to said video signal with suppressed field shading a direct offset level responsive to said measure of integrated dark currents.

18. A method for deriving the direct component of reference-black level for image samples supplied from a CCD imager of the field transfer type having A, B, and C registers comprising the steps of:
integrating over recurrent intervals of time, samples originating from the B register rather than the A register, to obtain respective integrals; and
sampling and holding each of the integrals thus obtained.

19. A method for deriving the direct component of reference-black level for image samples supplied from a CCD imager of the field transfer type having A, B, and C registers comprising the steps of:
extracting at recurrent times, via said C register from a portion of said B register not supplied image samples from said A register, responses to integrated dark current; and
holding said responses between said recurrent times.

20. The method of claim 18 or 19 including the further step of:
passing the held responses through a low-pass smoothing filter.

21. Apparatus for suppressing field shading in output signal froom a CCD imager of field transfer type with A and B and C registers, which output signal comprises fields of video samples in raster scan order generated in response to images projected into the A register and accompanied by responses to respective portions of the integrated dark current accumulated in the B register during the field, and further comprises between each field and the next succeeding field response to the remainder of integrated dark current accumulated in the B register during the field; said apparatus comprising:
time-division switch means for separating the output signal occurring during the fields from the output signal occurring at times between successive fields;
means for generating a field shading compensation waveform of amplitude controllable responsive to an automatic gain control signal;
means for differentially combining separated output signal occurring at times between successive fields with said field shading compensation waveform;
means for integrating the result over time to obtain said automatic gain control signal; and
means for differentially combining separated output signal occurring during the fields with said field shading compensation waveform to obtain video samples in which field shading is suppressed.

22. A method for operating a CCD imager of the field transfer type having
an A register with a number m of charge transfer channels of length n in number of charge transfer stages, m and n being positive integers;
a B register with a number m of charge channels of length p in number of charge transfer stages, p being a positive integer, the input stages of the charge transfer channels of said B register arranged in cascade after respective ones of the output stages of the charge transfer channels of said A register; and a C register with a charge transfer channel including m consecutive stages in cascade after respective ones of the output stages of said B register, said method including the steps of:

arranging that p is larger than n to provide room in the final rows of the B register to store built up remnant charge, as described below;

forward clocking said A and B registers during each of a succession of field transfer times interleaved with image integration times, to transfer charge samples descriptive of an image field from said A register to said B register and to advance remnant charges owing to dark current accumulation to the final rows of said B register, where these remnant charges build up;

forward clocking said B and C registers at each time in an interval comprising the close of a field transfer time and the beginning of the ensuing image integration time for removing the built-up remnant charges through an output of the C register before charge samples generated in the most recent image integration time are advanced out of said B register;

thereupon sensing the removed built up remnant charge, and developing a dark current comensation signal dependent on the magnitude of the removed built up remnant charge, which signal increments with such row advance in said B register during the ensuing image integration time;

halting clocking of said A register during each image integration time;

forward clocking said B register to advance samples forward one row at a time, while C register clocking is halted, the samples advanced from the final row of said B register being parallelly loaded into successive stages of said C register; and after each parallel loading of said C register, halting the forward clocking of said B register while forward clocking said C register to cause it to supply from an output thereof the row of parallelly loaded samples in serial order as CCD imager output signal uncorrected for integrated dark current;

combining each row of said uncorrected imager output signal with said dark current compensation signal to provide a CCD imager output signal corrected for integrated dark current; and continuously repeating said cycle of clocking, sensing removed built up remnant charge, developing dark current compensation signal, and combining uncorrected CCD imager output signal with dark current compensation signal.

23. A method for obtaining a measure of dark current arising in at least one charge transfer channel serially unloaded to provide an output response; said method comprising, besides a step of applying during recurrent time intervals clocking voltages of a given frequency and given phasing to gate electrodes overlying said charge transfer channel for serially unloading said charge transfer channel to supply a first output response portion, additional steps of:

applying further clocking voltages in said given phasing to said gate electrodes overlying said charge transfer channel, said further clocking voltages being applied during intervening time intervals between said recurrent time intervals and having a frequency substantially higher than said given frequency, for continuing serially unloading said charge transfer channel to supply a second output response portion;

separating said first and second portions of said output response from each other; and deriving said measure of dark current from said second portion of said output response.

24. The method of claim 23 used with a CCD imager of field transfer type having an image or A register, a field storage or B register and an output line or C register, wherein said measure of dark current is obtained from a plurality of charge transfer channels included in the B register of said CCD imager.

25. The method of claim 24 wherein the plurality of charge transfer channels included in the B register also function to provide transfer storage for charge packets provided as image samples from said A register and converted to portions of lines of raster-scanned imager output signal by said C register.

26. The method of claim 25 wherein all the charge transfer channels in said B register providing transfer storage for charge packets provided as image samples from said A register are used in obtaining said measure of dark current.

27. The method of claim 24 including wherein said step of deriving said measure of dark current essentially consists of integrating said second portion of said output response.

28. In combination, a CCD imager of field transfer type having an image or A register, a field storage or B register, an output or C register, and an output stage receptive of serial read-out of charge packets from said C register for supplying raster-scanned video signal with relatively long field trace and relatively short field retrace;

means applying synchronous clocking voltages to said A and B registers during each field retrace time for transferrring charge packets descriptive of image integrated in said A register during the preceding field trace from said A register to said B register;

means applying clocking voltages to said B register during line retrace times for advancing charge packets therein a line at a time and displacing a line of charge packets therefrom to parallelly load said C register;

means applying clocking voltages to said C register during line trace times, causing serial read-out of the charge packets parallelly loaded therein to said output stage, which responds to supply a scan line of said raster-scanned video signal, said raster-scanned video signal being undesirably accompanied by field shading attributable to dark currents being accumulated in said B register for progressively longer periods of time each scan line of field trace;

improved apparatus for generating a signal compensating against the field shading attributable to dark currents undesirably accompanying said raster-scanned video signal; and means for combining the signal so generated with said raster-scanned video signal to provide an imager output signal, in which field shading attributable to dark currents is suppressed, which improved apparatus includes, in addition to means for generating a waveform having consistent slope through a field interval for suppressing said field shading attributable to dark currents, the following:

means applying clocking voltages to said C register during at least portions of field retrace times, causing serial read-out of charge packets therein to said output stage, which responds to dark current accumulated in said B register during preceding field trace times to supply a remnant dark current signal; and means controlling the amplitude of said waveform in response to, said remnant dark current signal for compensating for temperature changes of said CCD imager, in suppressing said field shading attributable to dark currents.

* * * * *